United States Patent Office 2,710,465
Patented June 14, 1955

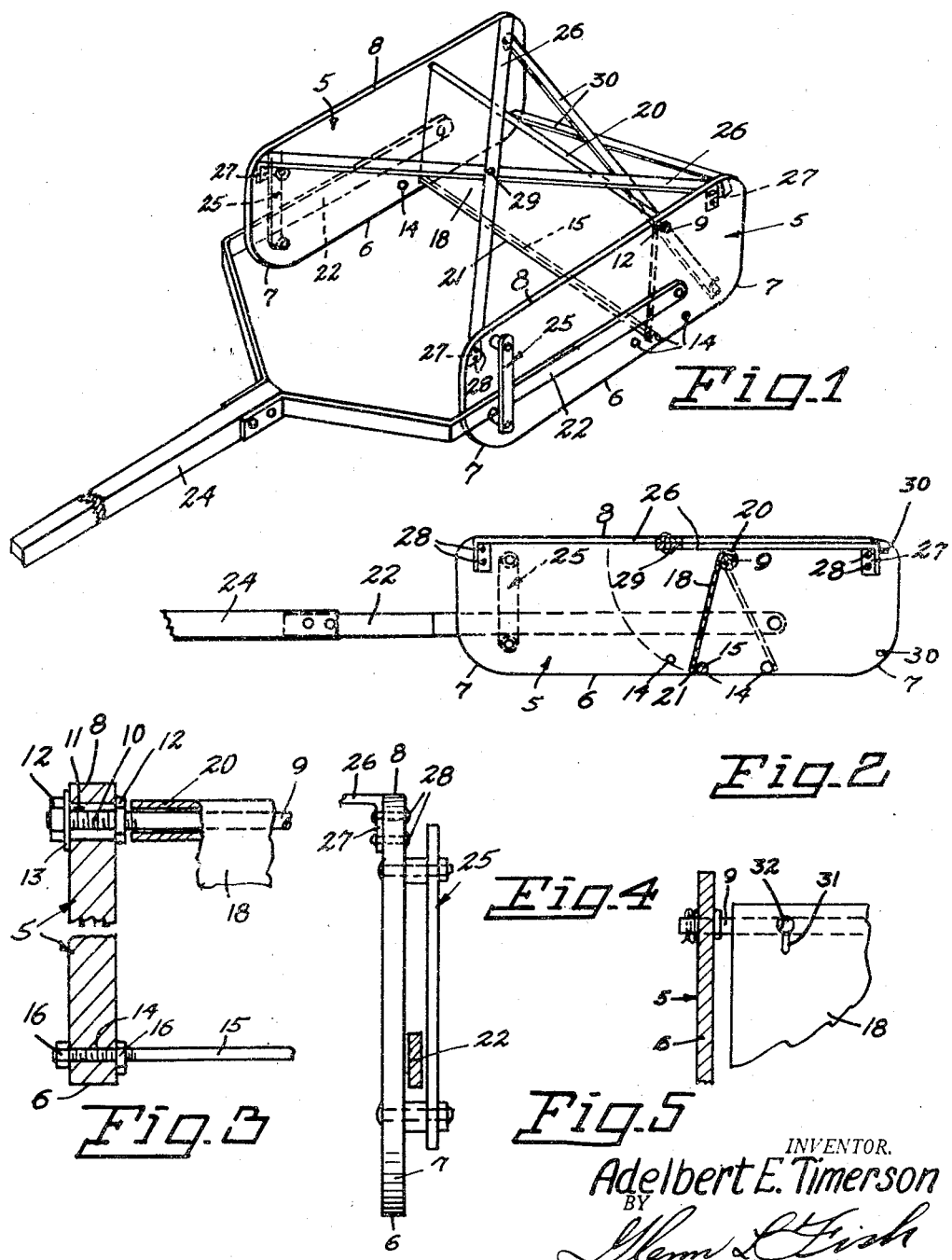
June 14, 1955     A. E. TIMERSON     2,710,465
MATERIAL MOVING IMPLEMENT
Filed March 7, 1952

2,710,465

MATERIAL MOVING IMPLEMENT

Adelbert E. Timerson, Spokane, Wash.

Application March 7, 1952, Serial No. 275,288

7 Claims. (Cl. 37—53)

My present invention relates to manually operated material moving implements and it is one object of the invention to provide an implement which is particularly adapted for manually removing snow from the inclined roof of a structure from a position standing upon the ground.

Another object of the invention lies in the provision of a light weight implement having runners or supports which are relatively thin and pass through the material to be moved and slide along the supporting surface of a roof.

Another object of the invention lies in the provision of a swingable plate pivotally carried transversely disposed by the supports and which will move to the horizontal position during rearward movement of the manually operable implement and present no barrier to the material as the implement moves therethrough but which will lower to a substantially vertical or right angle position relative to the surface when moving forwardly and thus carry a quantity of the material with the implement.

Another object of the invention lies in the provision of material breaking brace bars on the rear end of the implement and which serve the dual purpose of bracing the side boards as well as providing means for breaking the material, such as partially frozen snow, during rearward movement of the implement through the material.

These and other objects of the invention will become apparent during the course of the following description.

In the accompanying drawings, forming a part of this specification, and in which like numerals are employed to designate like parts, Figure 1 is a perspective view of my improved material moving implement, Figure 2 is a longitudinal cross section taken through the implement, Figure 3 is an enlarged fragmentary transverse cross section of one runner and the pivotal plate support and stop, and Figure 4 is a front elevation of one runner and associated parts upon an enlarged scale, and, Figure 5 is a fragmentary cross section showing a modified adjustable mounting for the plate.

Referring now more particularly to the drawings, I have shown the present preferred embodiment of my invention as comprising spaced vertically disposed parallel side boards 5—5 which constitute supports having lower edge faces 6—6 terminating in arcuate front and rear lower corners 7 and forming runners which render the implement movable longitudinally.

A transversely disposed rod 9, has its threaded end portions 10 extending through vertically disposed elongated apertures 11 formed axially aligned in the side boards 5 adjacent their top edges 8 and spaced rearwardly from the mid-point. Nuts 12 are applied to the threaded portion 10, one on each side of the corresponding side board 5, and tightened to clamp the boards therebetween. A washer as 13 may be applied under each nut if desired.

Radially disposed from the rod 9, I have provided transverse opening 14 in the side boards 5 adjacent the runner edges 6, each said opening being equidistant from said rod and axially aligned with a companion opening in the opposed side board 5. A second transversely disposed rod or bar 15 is supplied with inner and outer nuts 16 on its threaded ends 17 and is selectively movable from one set of companion openings 14 to another and constitutes a selectively adjustable stop for depending plate 18.

The upper marginal edge portion of plate 18 is loosely rolled about rod 9 to form a sleeve 20 and thus pivotally support the plate for vertical swinging movement about the rod 9. The lower marginal edge 21 of the plate 18 contacts the stop 15 which limits its rearward movement and the plate is of such width that when the plate is bearing against the stop as shown in Figures 1 and 2, its lower edge 21 is spaced upwardly from the runner edges 6 approximately ¼ inch. However, this distance may be varied by shifting the rod 9 vertically in apertures 11 to adapt the clearance to the type of material being moved with the implement.

At a point rearwardly of the longitudinal center and below the vertical center, each side board 5 is provided with a pivotally mounted arm 22 which extends forwardly beyond the forward ends of the side boards and thence angles inwardly and secures to a forwardly extending inflexible handle 24. Keepers 25 are secured to the side boards 5 on their outer faces and are disposed vertically adjacent to the forward end thereof, and the arms 22 pass through the keepers which are provided to strengthen the arms when it is desired to shift the movement of the implement under load tangentially.

Braces 26 have their end portions bent downwardly at 27 and there secured to the side boards 5 as by rivets 28 and the braces are disposed with the greater transverse dimension flat or horizontal and extend from the forward upper corner of one side board 5 to the rearward upper corner of the opposed side board 5, thus crossing at the center point of the implement's top edge, where a rivet 29 is provided to secure the two together.

Extending from the rearward upper corners of side boards 5 to the lower rearward corners of the opposed sideboard 5 are brace bars 30—30 with their edges disposed longitudinally of the implement to provide bars for breaking and loosening packed snow or other material and also brace the side boards 5.

When using the implement for removing snow from a roof, the implement is placed upon the snow on the roof by the operator standing upon the ground and by using the long handle 24, the implement is pushed upwardly to the ridge of the roof. The runners 6 being thin transversely, permit the implement to sink into the snow and slide upon the roof. Plate 18 is pivotally mounted upon rod 9 and therefore is swung upwardly and forwardly by the snow during the rearward movement permitting the snow to pass through the implement. Brace bars 30 break up any partially frozen areas of snow that may be forced through during the rearward movement.

Upon reaching the ridge of the roof, the direction of movement is reversed and the plate 18 then lowers and disposes a flat surface to the snow when resting against stop 15. The snow is thus pulled from the roof.

The plate 18 may be moved rearwardly and stop 15 secured in the rearmost apertures 14 to limit the forward swinging movement of the plate, and then the implement may be used from a position atop the roof and the snow pushed from above.

Figure 5 shows a modified means of adjustably mounting the plate 18 which comprises providing vertical slots 31 in plate 18 and headed screws 32 extend through the slots and are threaded into the rod 9 to clamp the plate in adjusted positions. Of course the sleeve 20 is omitted from the plate in this form and the apertures need only be journals for the rod which is secured by means of cotter keys or the like.

Having thus described my invention, I claim:

1. A light weight manually portable roof scraper comprising spaced vertically disposed longitudinally extending side boards having lower edge faces constituting runners, a transversely extending vertically swingable plate pivotally carried by said side boards adjacent to the upper edges thereof and depending therebetween, a selectively adjustable stop carried by the side boards and disposed to limit the swinging movement of said plate in one direction and at a position substantially vertical, in which position the lower edge of the plate is spaced upwardly from said runners, a forwardly extending inflexible handle pivotally carried by the side boards at a point spaced rearwardly from the substantially vertical position of said plate for unassisted manual reciprocation of the scraper, keepers on the side boards adjacent the forward end thereof and adapted to limit the pivotal movement of said handle, and material loosening brace bars secured between the side boards rearwardly of said plate.

2. A light weight manually portable roof scraper comprising spaced vertically disposed longitudinally extending parallel side boards having lower edges constituting runners, a transversely extending vertically swingable plate pivotally carried by said side boards and depending therebetween, a stop carried by the implement and adapted to limit the swinging movement of said side plate in one direction and at a position substantially vertical, said plate having its lower edge spaced upwardly from said runners, a stiff inflexible handle pivotally carried by the side boards for unassisted manual reciprocation of the scraper and extending forwardly therefrom, and material loosening brace bars secured to the side boards rearwardly of said plate.

3. A light weight manually portable roof scraper comprising spaced vertically disposed parallel side boards having lower edge faces constituting runners, a transversely extending rod secured at one end in one side board and the other end in the opposed side board adjacent to the upper edges thereof, a depending plate pivotally carried by said rod for free vertical swinging movement and having its lower edge terminating spaced above said runners, a selectively adjustable stop carried by the implement and adapted to limit the swinging movement of said plate in one direction, and an inflexible handle carried by the side boards and extending longitudinally of the implement, for unassisted manual reciprocation of the scraper.

4. A light weight manually portable roof scraper comprising spaced vertically disposed longitudinally extending one-piece side boards having lower edge faces constituting runners, a transversely extending rod secured at its ends in the side boards adjacent their upper edges and intermediate their lengths, a transversely disposed plate extending between the side bars and having a sleeve along its upper edge, said rod extending through said sleeve and pivotally supporting the plate for free vertical swinging movement, said plate being of a width adapting its lower edge to be spaced above said runners when in the vertical position, a selectively adjustable stop carried by said side boards and disposed to limit the free swinging movement of said plate in one direction at an operative position, material loosening brace bars secured between the side bars rearwardly of the plate, and an inflexible relatively long handle carried by the implement for unassisted manual lifting and reciprocation of the scraper from a point removed therefrom.

5. A light weight manually portable roof scraper comprising spaced vertically disposed longitudinally extending side boards having lower edge faces constituting runners, horizontally disposed cross bracing secured to the side boards at their upper edges and maintaining the runners in spaced parallel relation to each other; vertically disposed cross braces secured to the side boards at their rear ends constituting material loosening bars and maintaining the side boards in parallel planes; a transversely extending rod secured at its ends in the side boards adjacent to their upper edges and spaced from the rear ends thereof; a transversely disposed plate extending between the side boards and having a sleeve along its upper edge encircling said rod and pivotally supporting said plate for free vertical swinging movement, said plate being of a width adapting its lower edge to be spaced above said runners when in the vertical position; a selectively adjustable stop carried by said side boards and disposed to limit the free swinging movement of said plate in one direction at selected operative positions, whereby the vertical distance between the lower edge of said plate and the runner is variable; and a stiff handle secured to said implement for manually lifting said implement to place it upon a roof and permitting manual reciprocation of said implement for scraping snow therefrom.

6. A light weight manually portable roof scraper comprising spaced longitudinally extending parallel supporting runners; a transversely extending vertically swingable plate carried by the runners and adapted to be freely shiftable from a vertical plane disposed between the runners to a horizontal plane; said plate having its lower edge spaced above the runners when in the vertical position; a selectively adjustable stop carried by the implement and adapted to limit the swinging movement of said plate in one direction; and an inflexible handle carried by the side boards and extending longitudinally of the implement for unassisted manual reciprocation of the scraper.

7. A light weight manually portable roof scraper comprising a free vertically swingable plate pivotally carried by supporting means adapted to move upon a surface; said plate having a lower edge spaced above the lower edge of said supporting means whereby the plate edge clears the surface; a selectively adjustable stop carried by the supporting means and adapted to limit the swinging movement of said plate in one direction; and an inflexible handle carried by the side boards and extending longitudinally of the implement for unassisted manual reciprocation of the scraper.

References Cited in the file of this patent

UNITED STATES PATENTS

| 463,353 | Hackett | Nov. 17, 1891 |
| 548,527 | Dixon | Oct. 22, 1895 |
| 1,000,258 | Greenlee | Aug. 8, 1911 |
| 1,629,900 | Youngman | May 24, 1927 |
| 1,685,487 | Hale | Sept. 25, 1928 |
| 1,690,886 | Crombie | Nov. 6, 1928 |
| 1,775,206 | McCandliss | Sept. 9, 1930 |
| 1,824,989 | Fundon | Sept. 29, 1931 |
| 2,552,426 | Hedley | May 8, 1951 |
| 2,603,892 | Fischer | July 22, 1952 |

FOREIGN PATENTS

| 379,689 | Germany | Aug. 27, 1923 |